(12) United States Patent
Kawanishi

(10) Patent No.: US 7,625,082 B2
(45) Date of Patent: Dec. 1, 2009

(54) EYEGLASSES

(75) Inventor: Noboru Kawanishi, Higashiosaka (JP)

(73) Assignee: Yamamoto Kogaku Co., Ltd., Osaka (JP)

( * ) Notice: Subject to any disclaimer, the term of this patent is extended or adjusted under 35 U.S.C. 154(b) by 0 days.

(21) Appl. No.: 12/264,633

(22) Filed: Nov. 4, 2008

(65) Prior Publication Data

US 2009/0161062 A1 Jun. 25, 2009

(30) Foreign Application Priority Data

Nov. 6, 2007 (JP) ............................. 2007-288602

(51) Int. Cl.
*G02C 5/14* (2006.01)

(52) U.S. Cl. ..................................... 351/120

(58) Field of Classification Search ................ 351/120, 351/110, 116, 140, 118, 119, 153, 41; 16/228
See application file for complete search history.

(56) References Cited

U.S. PATENT DOCUMENTS

| | | | | |
|---|---|---|---|---|
| 5,638,147 A | * | 6/1997 | Wang-Lee | 351/120 |
| 5,760,867 A | * | 6/1998 | Pernicka et al. | 351/120 |
| 5,980,038 A | * | 11/1999 | Chen | 351/120 |
| 6,102,542 A | | 8/2000 | Masuda | |
| 6,467,902 B2 | * | 10/2002 | Wang-Lee | 351/120 |

FOREIGN PATENT DOCUMENTS

| | | |
|---|---|---|
| JP | 2549781 | 10/1997 |
| JP | 11-237589 | 8/1999 |

* cited by examiner

*Primary Examiner*—Hung X Dang
(74) *Attorney, Agent, or Firm*—Heslin Rothenberg Farley & Mesiti P.C.

(57) ABSTRACT

A pair of eyeglasses includes angle adjusting members. In Each angle adjusting member, a supporting shaft member projecting on an inside of the external body and a supporting shaft member projecting on an inside of the internal connect body are connected together and inserted in on a supporting hole provided on the connecting body of the frame. An engaging claw projecting on the inside of the internal connect body is to be selectively engage with one of plural engaging notches provided on the outer edge portion of the connecting body. The external connect body is superposed on an outside of the connecting body and the internal connect body is superposed on an inside of the connecting body. In this pair of eyeglasses, angle adjustment between the lens and the temples is easy. The angle adjusting members does not protrude outwardly from the frame. Replacement of lenses is also easy. Also this pair of eyeglasses has no metal part and does not produce a problem in disposal.

7 Claims, 18 Drawing Sheets

EYEGLASSES

BACKGROUND OF THE INVENTION

The present invention relates to eyeglasses usable as sports sunglasses for use in skiing, snowboarding, cycling, marathon and the like and as protective glasses for use in construction, civil engineering, electric work and the like.

DESCRIPTION OF PRIOR ART

Conventionally, this kind of glasses includes eyeglasses in which, in order to allow a wearer to have a good view, move easily or work smoothly depending on the weather, kind of the sports or environment of construction site or the like, the angle between a lens (or lenses) and temples is changeable so as to adjust the comfortability to a wearer's face, and eyeglasses in which lenses are replaceable to change the brightness of the lens.

The eyeglasses in which the angle between a lens and a temple is adjustable are described, for example, in Japanese Utility Model No. 2549871. As shown in FIGS. 10 to 13, each of both outer portions of the frame 22 with lenses 21 is provided with a mounting portion 23 on which a rotary plate 26 is superposed, the rotary plate 26 being mounted to a front portion of a temple 25 through an adjuster 24, and a stopper body 27 is superposed on an outside portion of the rotary plate 26. This stopper body 27 has a head portion 27a and an engaging shaft 27b projecting from this head portion 27a. The engaging shaft 27b is inserted through the rotary plate 26 and the mounting portion 23 of the frame 22 not to come off therefrom in the fashion that the rotary plate 26 is held rotatably around the engaging shaft 27b of the stopper body 27 between the head portion 27a of the stopper body 27 and the mounting portion 23 of the frame 22. Further, a resisting member 28 for giving a resistance to a rotation of the rotary plate 26 around the engaging shaft 27b is provided to stop the rotary plate 26 at any rotary position, so that the angle of the temple 25 mounted on the outer portion of the frame 22 can be adjusted freely.

The eyeglasses in which lenses are replaceable are described, for example, in Japanese Patent Application Laid-Open No. 11-237589. As shown in FIGS. 14 to 18, in case a couple of temples 33 and 33 are attached to respective right and left sides of the one-eye type lens 31 through respective temple attachment members 32, the lens 31 is provided with a first cutout portion 34 and a second cutout portion 35 at each of the right and left top end portions, the portions 34 and 35 are continuously formed from inside to outside and the respective top end portions are lowered by two steps. Two screw holes are provided near each of the first cutout portions 34 and each of the temple attachment members 32 is to be fixed there with screws 37 which are inserted from inside through the holes.

Each of the temple attachment members 32 has a branched shape with a fixing portion 32a which is to be fixed to the lens 31 and a swing portion 32b which is to be mounted to the temple 33. The fixed potion 32a has, in its bottom face, a fitting groove 38 concavely disposed to be fitted with the lens 31, and, on the outside face, two screw holes 39 which communicate with the fitting groove 38. The fitting groove 38 is fitted by a portion near the screw holes 36 of the lens 31, and the screws 37 are screwed in through the screw holes 39 and 36, so that the fixing portion 32a and the lens 31 is fixed together.

Therefore, in the conventional glasses assembled as above, by releasing the engagement between the screws 37 and the screw holes 39 and 36, the lens 31 can be separated from the temple attachment members 32 and replaced with another lens 31.

However, in a pair of glasses in which the angle between a lens and a temple can be adjusted freely, each rotary plate 26 attached to the front end of each temple 25 through each adjuster 24 is superposed on each mounting portion 23 provided on each outer portion of the frame 22, and furthermore each stopper body 27 is superposed on the outside of the each rotary plate 26. These components largely protrude outward from the frame 22 as shown in FIG. 10. These protruding portions become an obstacle when a wearer puts the glasses on, and interfere with working. In case the glasses are used as sports sunglasses, air resistance in use becomes large, which produces a disadvantage for doing sports.

In the aforementioned glasses, the rotary plate 26 attached to the front end of the temple 25 through the adjuster 24 is connected to the adjuster 24 with a pin 29. Thus, a tool for connecting them with the pin is required and, since this pin 29 is made of metal and the glasses become problematic when being thrown away.

In glasses in which lenses are replaceable, removal of the screws 37 for replacement of the lens 31 is troublesome and replacement of the lens 31 with another lens is time-consuming. And the removed screws 37 are likely to be inadvertently dropped or lost. The screws 37 made of metal further produce a problem at the disposal of the glasses.

SUMMARY OF THE INVENTION

It is hence an object of the present invention to solve the conventional problems states above, more specifically to provide a pair of eyeglasses in which the angle adjustment between the lens and temples is easy, angle adjusting members do not protrude outwardly from the frame and replacement of lenses is easy, and which has no metal part and does not produce a problem in disposal.

In a pair of eyeglasses according to the present invention, which has a frame with a lens and a couple of left and right temples provided at left and right sides of the frame respectively through angle adjusting members, wherein left and right end portions of the frame are provided with connecting bodies for the angle adjusting members, each of the angle adjusting members includes one of the connecting bodies, an external connect body and an internal connect body, respectively being of plate-shape. A supporting shaft member projecting on an inside of the external body and a supporting shaft member projecting on an inside of the internal connect body are connected together and inserted in on a supporting hole provided on the connecting body of the frame, an engaging claw projecting on the inside of the internal connect body selectively engages with one of plural engaging notches provided on the outer edge portion of the connecting body, and the external connect body is superposed on an outside of the connecting body and the internal connect body is superposed on an inside of the connecting body.

And in the goggles according to the present invention, the frame, the lens, the angle adjusting members and the temples are made of synthetic resin.

Further, in the glasses according to the present invention, the frame has at least at one position of an upper pressing portion with a small protrusion on a bottom thereof and lower pressing portions under both sides of the upper pressing portion. The lens is provided with an inner flange at a top edge thereof, the inner flange includes pinch portions to be caught and held between the upper and lower pressing portions, the pinch portions are formed in recess on a upper face of the inner flange and has stopping portions on these recesses. The pinch portions of the inner flange of the lens are received between the upper and lower pressing portions of the frame, the small protrusion of the upper pressing portion is engaged with the stopping portion of the pinch portion of the inner flange so that the lens is detachably attached to the frame.

The glasses according to the present invention, the lens has, at its left and right side end, cutout space portions into which at least front outer portions of the angle adjusting members are received so that the outside of the angle adjusting members substantially flush with a front face of the lens which enables angle transition of the angle adjusting members.

And moreover, in the eyeglasses according to the present invention, the external contact body has a supporting groove at its rear end and each of the temples has a supporting shaft at its front end and the supporting shaft is rotatably supported in the supporting groove.

In the glasses according to the present invention, a substantially U-shaped hole is provided so as to surround the engaging claw projecting on the inside of the internal contact body.

And in the glasses according to the present invention, a rear half portion of each of the temples has an ear piece which is freely adjustable in position to be held on a wearer's ear.

With the structure stated above, in the eyeglasses of the present invention, the angle between the lens and the temples can be adjusted easily, thereby resulting in high operability. The angle adjusting members do not project outwardly from the frame, and they do not become obstacles when a wearer puts them on and interfere working. As a result, when the pair of eyeglasses is used as sports sunglasses, air resistance will not be larger when the goggles are in use and they produce no disadvantage for doing sports.

Moreover, in the glasses of the present invention, replacement of lenses can be easy and less time-consuming. No screws are required and there is no possibility to drop or lose screws inadvertently. Furthermore they have no metal part and produce no problem in disposal.

DETAILED DESCRIPTION OF THE PREFERRED EMBODIMENTS

Hereinafter, an embodiment carrying out the glasses of the present invention will be described in detail with reference to the drawings.

Figure 1:
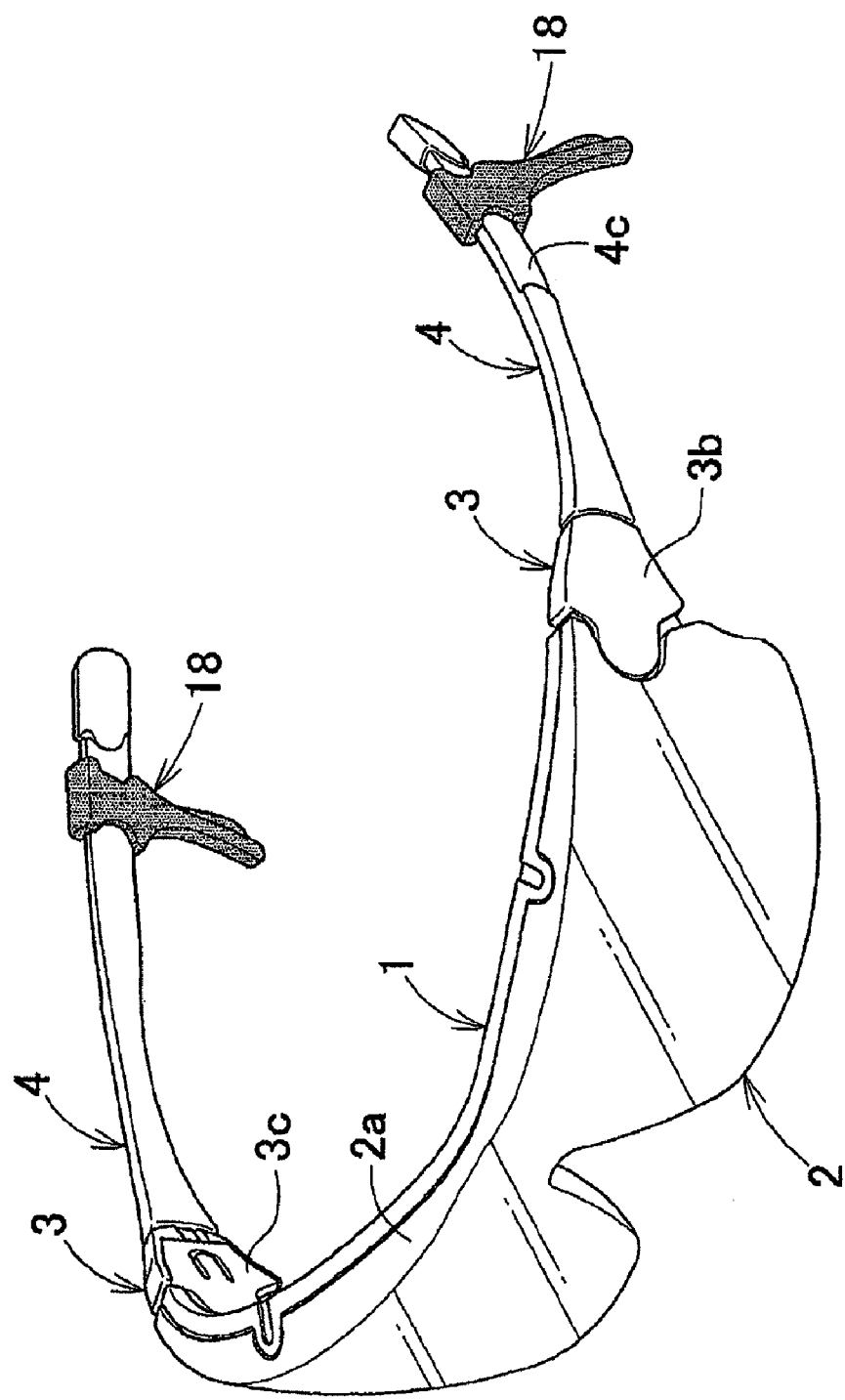
FIG. 1 is a perspective view showing an embodiment of a pair of eyeglasses of the present invention.
Figure 2:
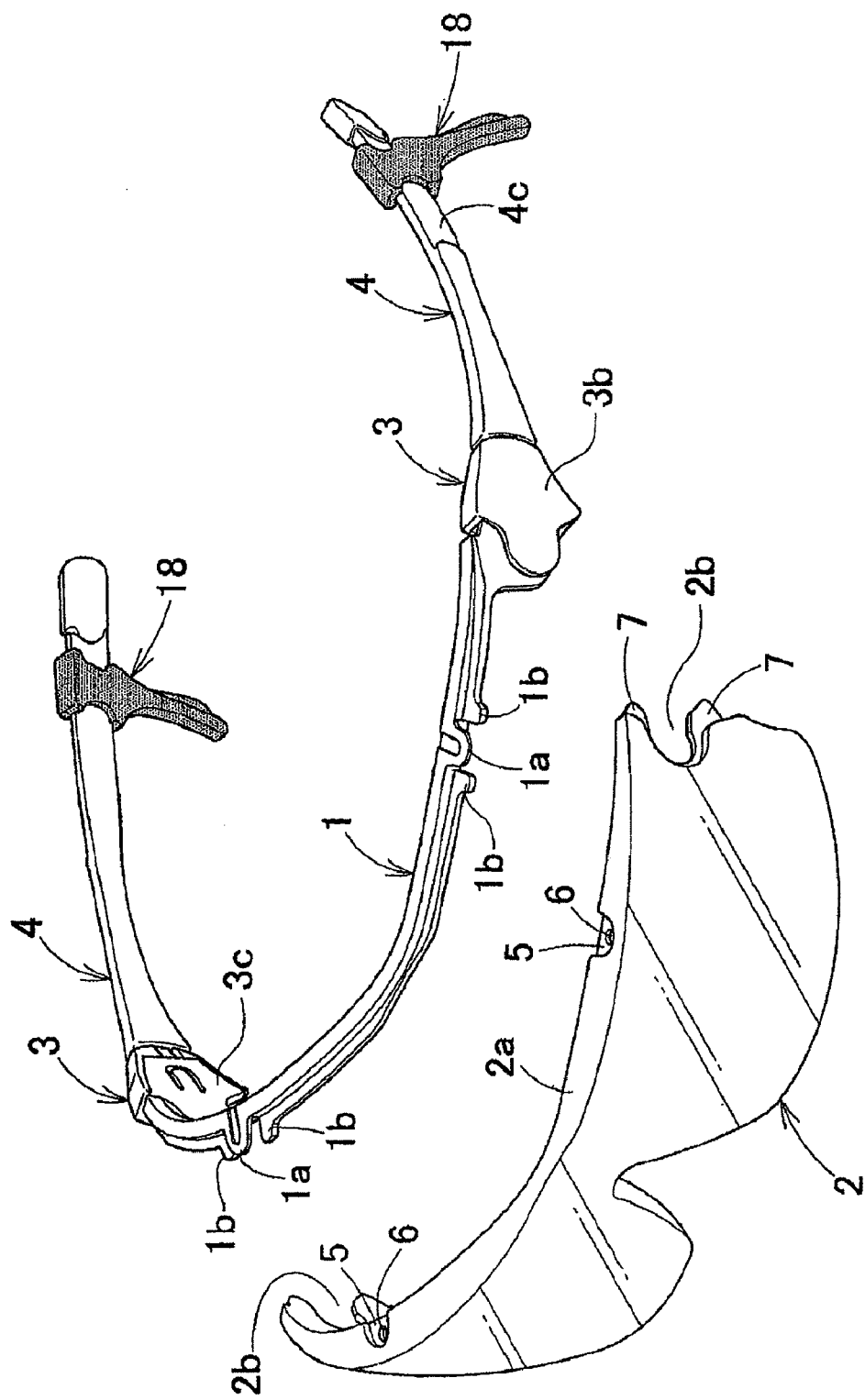
FIG. 2 is a partially exploded perspective view of the pair of eyeglasses shown in FIG. 1.

In the glasses of the present invention, as shown in FIGS. 1 and 2, a lens 2 is detachably attached to a frame 1 and a couple of right and left temples 4 are respectively attached to right and left sides of frame 1 through angle adjusting members 3.

Figure 3:
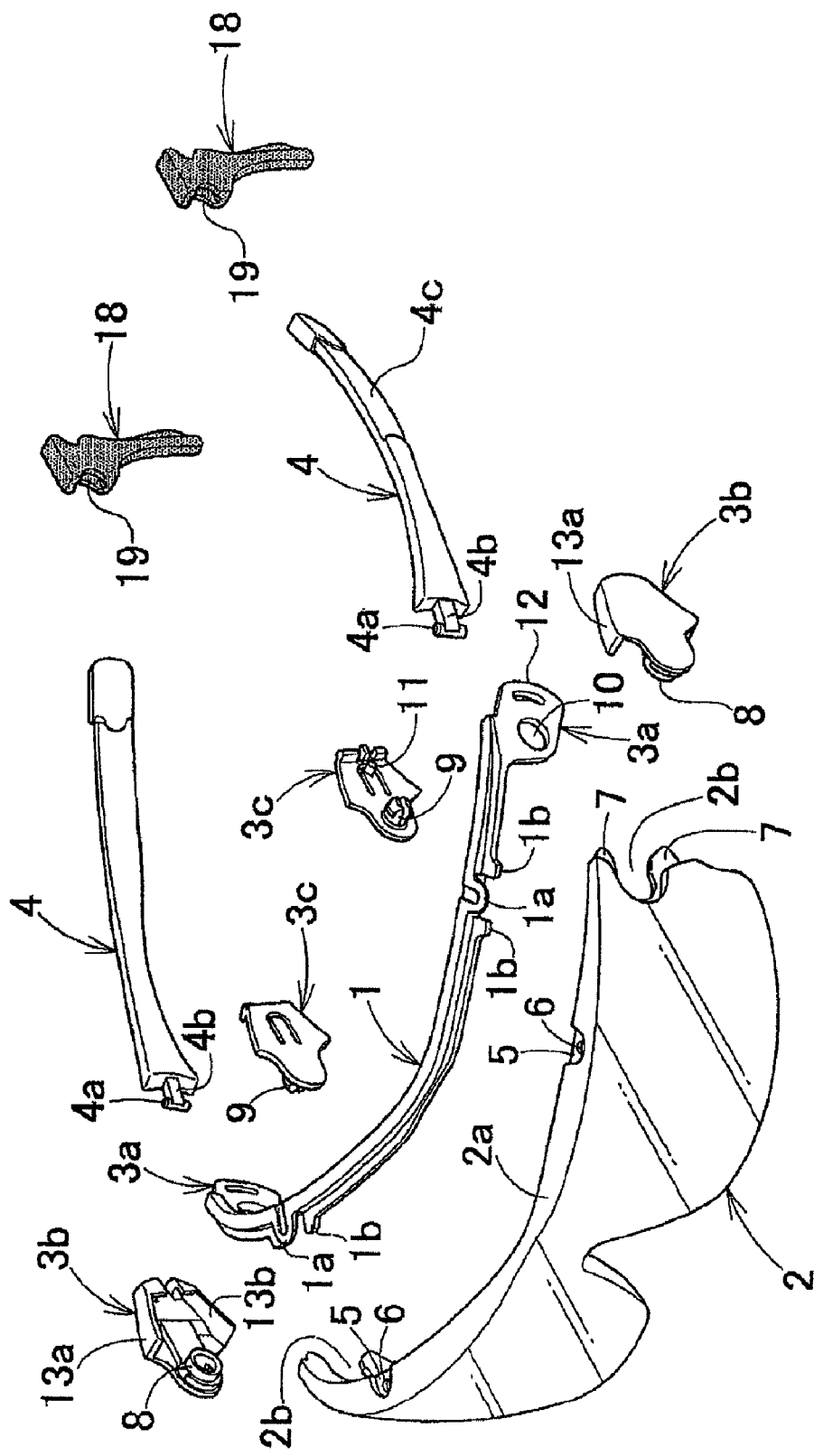
FIG. 3 is an exploded perspective view of the pair of eyeglasses of the present invention shown in FIG. 1.
Figure 4:
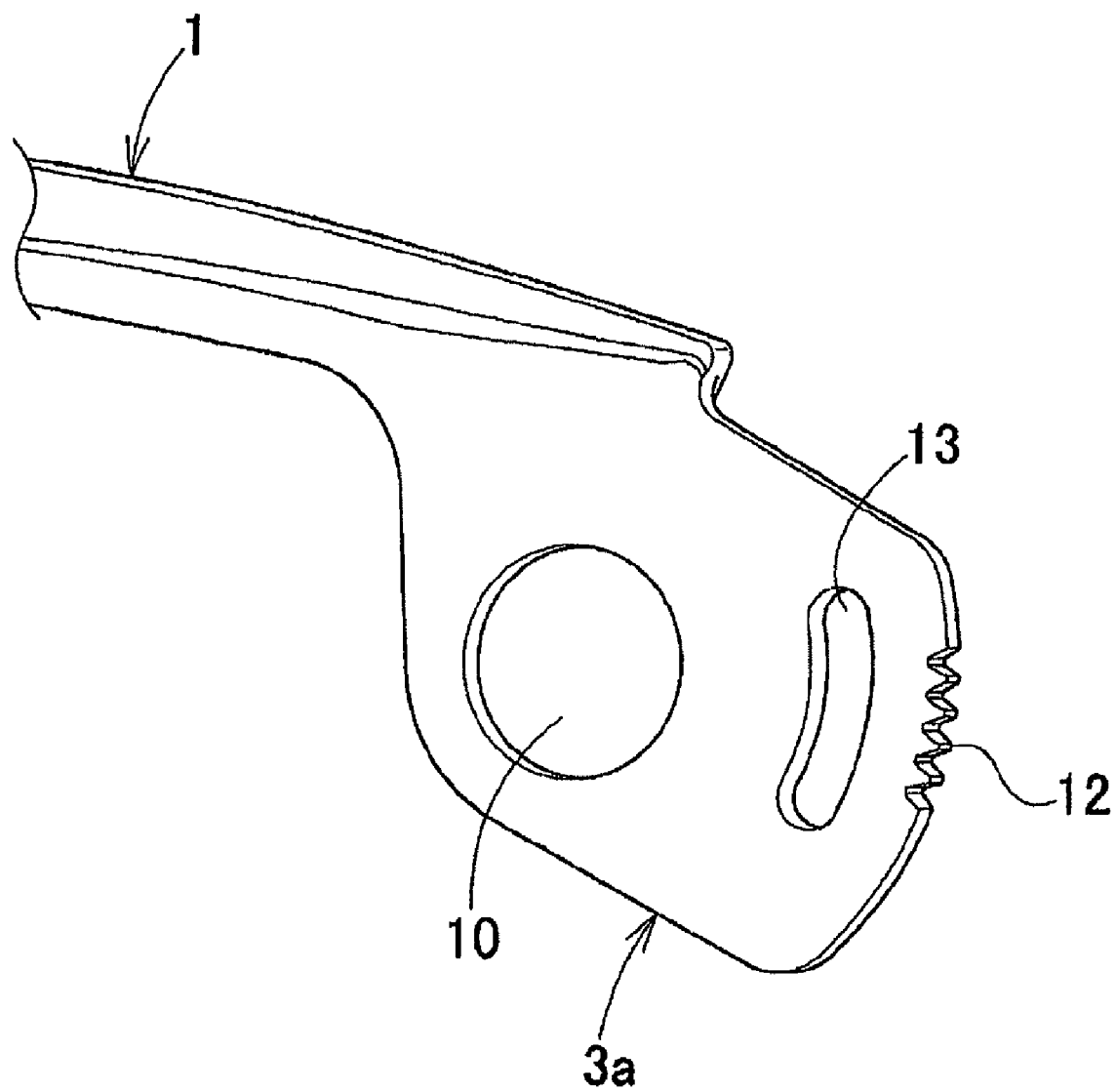
FIG. 4 is a perspective view showing a connecting body of an angle adjusting member provided at an end portion of a frame of the eyeglasses of the present invention.
Figure 5:
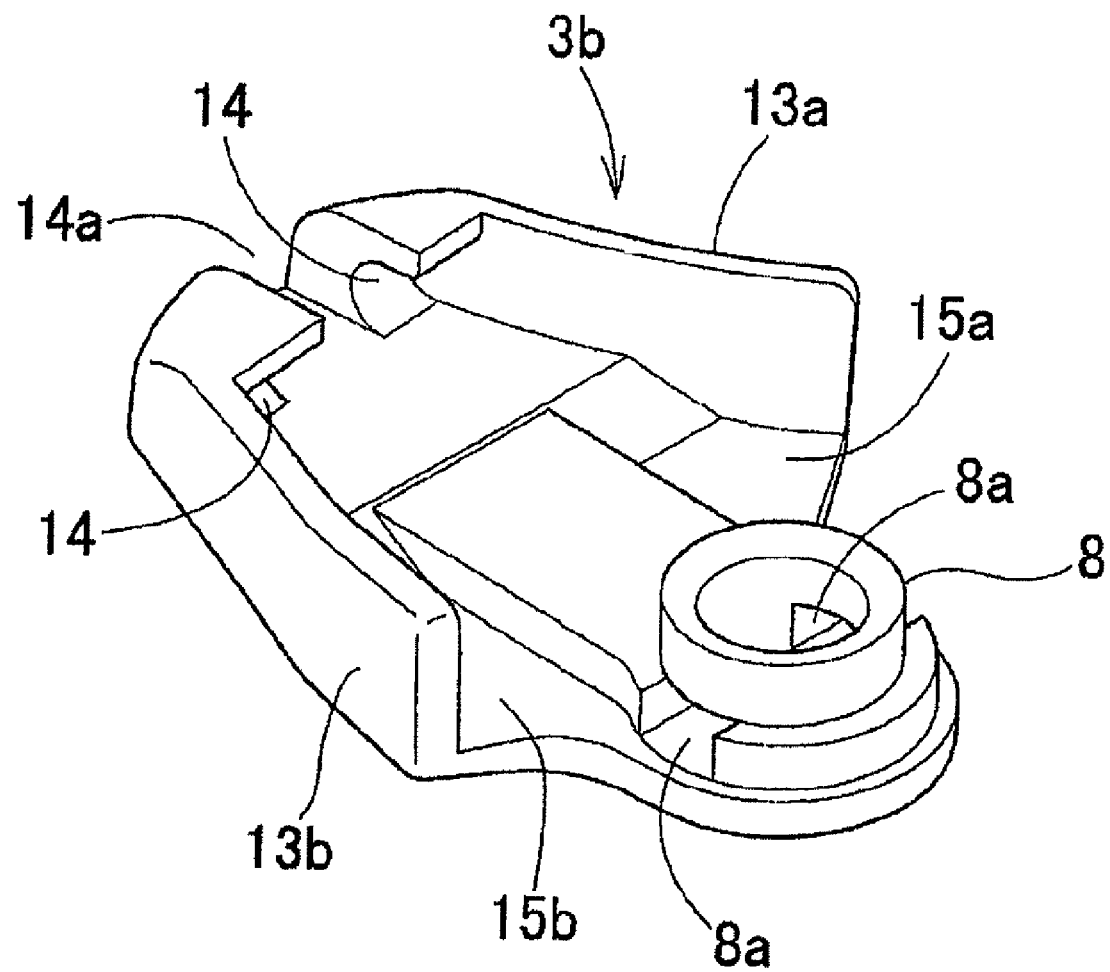
FIG. 5 is a perspective view of an external contact body of the angle adjusting member of the eyeglasses of the present invention.
Figure 6:
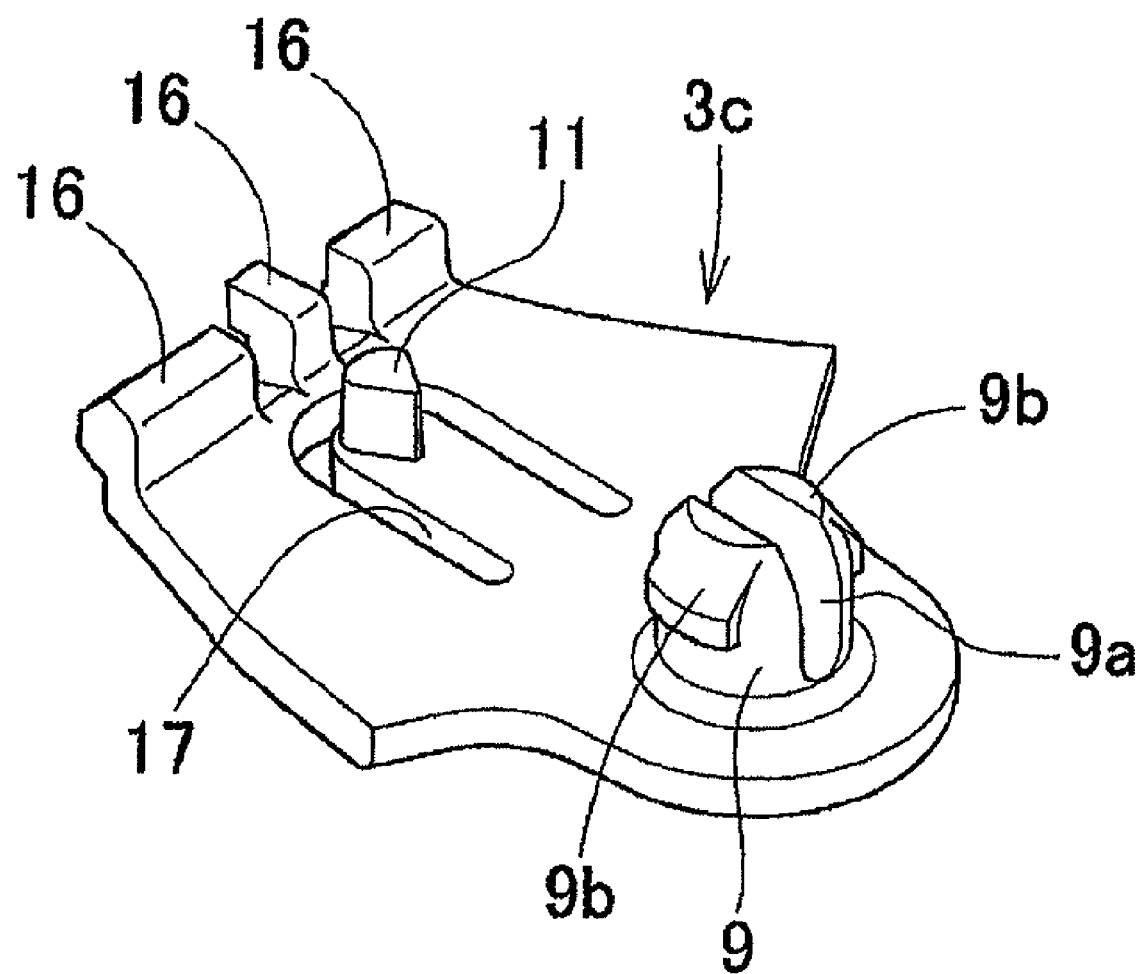
FIG. 6 is a perspective view of an internal contact body of the angle adjusting member of the eyeglasses of the present invention.

The frame 1, shown in FIGS. 3 and 4, is made of synthetic resin having flexibility, for example, polycarbonate resin, bent at a curvature corresponding to a curved face of the lens 2 and attached to and along the top edge of the lens 2. The frame 1 has upper pressing portions 1a at two positions on the right and left from the center of the front side thereof. Each upper pressing portion 1a has a small protrusion (not shown) on its bottom face. Further, lower pressing portions 1b are provided on both sides of and slightly below each upper pressing portion 1a. Between these upper and lower pressing portions 1a and 1b, an inner flange 2a at the top end of the lens 2 described later is to be held, so that the lens 2 is to be detachably attached. The frame 1 has a connecting body for an angle adjusting member 3 at each of right and left end portions as one body. Although the foregoing upper pressing portions 1a are provided at two positions on the right and left from the center of the front side of the frame 1, there may be one upper pressing portion 1a at a single position in the center of the front side of the frame 1 or three upper pressing portions 1a at three positions including one position at in the center of the front side of the frame 1 and two positions on the right and left from the center. The upper pressing portion 1a at least at one position of the front side of the frame 1 will suffice.

The lens 2 is made of synthetic resin having flexibility, for example, polycarbonate resin, has a curved face having an any curvature, and is a single-lens type (a right and left unitary lens). As described above, the lens 2 has the inner flange 2a on the top edge thereof and this inner flange 2a has a pinch portion 5 which is caught and held between the upper and lower pressing portions 1a and 1b. This pinch portion 5 is formed by depressing the top surface of the inner flange 2a and a stopping portion 6 is provided in this depressed portion. Therefore, when the inner flange 2a of the lens 2 is caught by and between the upper and lower pressing portions 1a and 1b of the frame 1, the upper pressing portion 1a is received within the pinch portion 5 without projecting out from the top surface of the inner flange 2a. Further, the projection provided on the upper pressing portion 1a engages with the stopping portion 6 provided in the pinch portion 5, so as to prevent the inner flange 2a from coming off from the upper and lower pressing portions 1a and 1b while the glasses are in use. Lifting the upper pressing portion 1a upward and releasing the engagement between the projection and the stopping member 6 allow the lens 2 to be removed from the frame 1 and replaced with another lens.

The top portion of each of right and left ends of the lens 2 has a semi-circular cutout to form a space portion 2b into which at least the front outer side portion of the angle adjusting member 3 is received in a way that the outer side face of the angle adjusting member 3 flushes with the front face of the lens and which enables an angular transition of the angle adjusting member. Blind pieces 7 project outward from the upper and lower peripheral edges of the space portion 2b. The space portion 2b may be formed to receive not only the front outer side portion of the angle adjusting member 3 but also the entire outer side portion. Since the front outer portion of the angle adjusting member 3 is formed in a substantially semi-circular shape, the space portion 2b is formed similarly in this shape, however, it may be in another shape depending on the shape of the front outer portion of the angle adjusting member 3.

Each of the angle adjusting members 3, as shown in FIGS. 3 to 6, includes an external contact body 3b and an internal contact body 3c, which are made of synthetic resin having flexibility, for example, polycarbonate resin, and the connecting body 3a, and these bodies are respectively of a sheet form.

The connecting body 3a has a supporting hole 10 and plural engaging notches 12. The supporting hole 10 is disposed substantially in the center of the body 3a and receives a supporting shaft member 8 projecting on the external contact member 3b and a supporting shaft member 9 projecting on the internal contact body 3c in a way that these shaft members are connected together and rotatably, while the engaging notches 12 are disposed on the arc-shaped outer edge portion of the body 3a, an engaging claw projects on the inside of the internal contact body 3c and selectively engages with one of the plural engaging notches 12. Near and along the plural engaging notches 12, an elongated hole 13 is provided. This elongated hole 13 functions as a space for dissipating a resistance force generated at the time of engagement between the engaging claw 11 and the engaging notches 12.

The external contact body 3b has the supporting shaft portion 8 which project from the inside of the front end portion and inner flanges 13a and 13b respectively at its upper and lower end portions. It further has a supporting groove 14 at its rear end portion which is for a supporting shaft 4a provided at the front end of the temple 4. The external contact body 3b is provided with insertion grooves 15a and 15b behind the supporting shaft member 8 in which the blind pieces 7 of the lens 2 are to be inserted. The supporting shaft portion 8 of the external contact body 3b is a hollowed cylinder and a retaining hole 8a is provided under the cylinder.

The internal contact body 3c has the supporting shaft member 9 which project on the inside of its front end portion, and its upper and lower end portions are formed to extend along the internal faces of the inner flanges 13a and 13b of the external contact body 3b. The rear end portion of the body 3c has retaining pieces 16 for the supporting shaft 4a of the temple 4 supported rotatably in the supporting groove 14 of the external contact body 3b. Behind the supporting shaft member 9 of the internal contact body 3c, the engaging claw 11 projects out and selectively engage with one of the plural engaging notches 12 provided on the outer edge portion of the connecting body 3a. A substantially U shaped hole 17 is provided to surround the engaging claw 11. The hole 17 functions as a space for dissipating a resistance force which is generated at the time of engagement between the engaging claw 11 and the engaging notches 12. The supporting shaft member 9 of the internal contact body 3c is of a column and has a dividing groove 9a in the center thereof to divide this column into two sections and a retaining portion 9b is provided at the front end of each divided section. At the time of assembling the angle adjusting member 3 as described later, the supporting shaft member 9 of the internal contact body 3c is inserted into the supporting shaft member 8 of the external contact body 3b so that the retaining portions 9b are retained by the retaining hole 8a and the supporting shaft members 8 and 9 are connected together. The configurations of the supporting shaft members 8 and 9 may be inverted and the supporting shaft member 8 of the external contact body 3b may be inserted the supporting shaft member 9 of the internal contact body 3c so that the retaining portions 9b are retained by the retaining hole 8a and the supporting shaft members 8 and 9 are connected together.

The temple 4 is made of synthetic resin having flexibility, for example, polycarbonate resin and formed into an arc shape as a whole to fit with a wearer's head. As stated above, the front end of the temple 4 has the supporting shaft 4a which is supported rotatably by the supporting groove 14 provided at the rear end portion of the external contact body 3b. More specifically the supporting shaft 4a is provided at the front end of the temples 4 through an extending portion 4b and this extending portion 4b is received in an intermediate cutout portion 14a of the supporting groove so as to be rotatable with regard to the supporting groove 14.

Furthermore the rear end portion of the temple 4 has an ear piece member 18 which is freely adjustable in position to be on a wearer's ear. The ear piece member 18 is made of resin having flexibility, for example, silicon resin, and the portion which is to extend along a rear part of a wearer's ear is formed into an arc shape. The ear piece member 18 has an insertion hole 19 for an attachment portion 4c formed at the rear half portion of the temple 4 and is inserted from the rear end of the temple 4 so as to be slidable on the attachment portion 4c and adjustable to a position where the member 18 fits with the rear part of a wearer's ear. The opening peripheral end of the insertion hole 19 of the ear piece member 18 is cut out into an inlet form so as to enlarge the opening end of the insertion hole 19 and facilitate the insertion of the attachment portion 4c of the temple 4.

The angle adjusting members 3 are assembled respectively between the right and left end portions of the frame 1 and a couple of the right and left temples 4 as follows.

First, each supporting shaft member 8 projecting on the inside of each external contact body 3b is inserted into each supporting hole 10 in each connecting body 3a provided on each of the right and left end portions of the frame 1. Then, each supporting shaft 4a provided on the front end of each temple 4 is supported rotatably by each supporting groove 14 provided in the rear end portion of each external contact body 3b.

Then, each supporting shaft member 9 projecting on the inside of each internal contact body 3c is inserted into each supporting hole 10 in each connecting body 3a is inserted into each supporting hole 10 in each connecting body 3a and into the associated supporting shaft member 8 to connect them together. While each engaging claw 11 projecting on the inside of each internal contact body 3c is engaged selectively with one of the plural engaging notches 12 provided in the outer edge portion of each connecting body 3a, each external contact body 3b is superposed on the outside of each connecting body 3a and each internal contact body 3c is superposed on the inside of each connecting body 3a.

Figure 7:
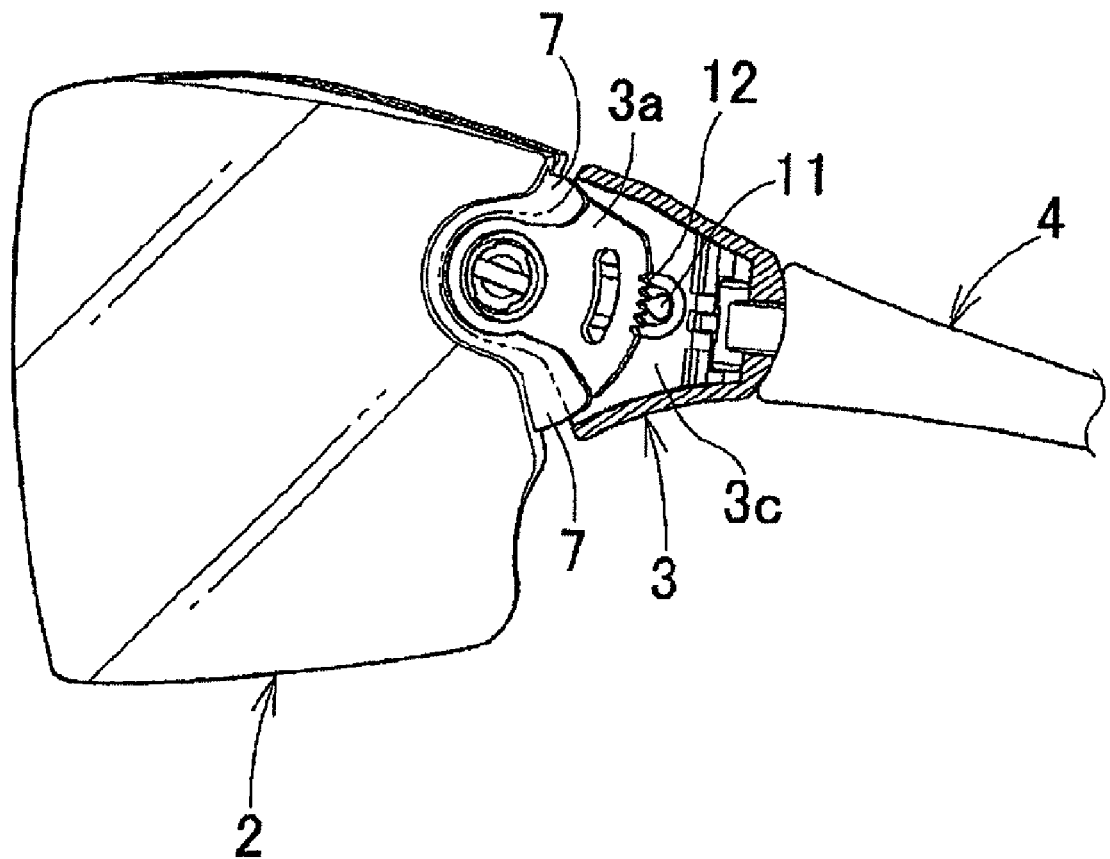
FIG. 7 is an explanatory view showing a posture after an adjustment of the angle between the lens and the temple of the eyeglasses of the present invention.

In the glasses of the present invention assembled as stated above, at the time of adjustment of the angle between the lens 3 and one of the temples 4, for example, as shown in FIG. 7, the temple 4 may be pushed down or pulled up from a position where the engaging claw 11 of the internal contact body 3c engages with one middle notch 12 of the plural engaging notches 12 of the connecting body 3a of the angle adjusting member 3. Then, the supporting shaft member 8 of the external contact body 3b and the supporting shaft member 9 of the internal contact body 3c are rotated around the supporting hole 10 in the connecting body 3a, and the engaging claw 11 of the internal contact body 3c is stepwise shifted to engage with another upper or lower engaging notch 12 of the plural engaging notches 12 of the connecting body 3a. This engagement allows to adjust the angle between the lens 2 and the temple 4. For example, when the temple 4 is pushed down from the position in FIG. 7 to engage the engaging claw 11 of the internal contact body 3c with the lowest engaging notch 12 of the plural engaging notches 12 of the connecting body 3a of the angle adjusting member 3, the lens 2 and the temple 4 become to have an angle shown in FIG. 8. On the other hand, when the temple 4 is pulled up from the position in FIG. 7 to engage the engaging claw 11 of the internal contact body 3c with an uppermost engaging notch 12 of the plural engaging notches 12 of the connecting body 3a of the angle adjusting member 3, the lens 2 and the temple 4 become to have an angle shown in FIG. 9.

Therefore, the angle between the lens 2 and the temple 4 in the glasses of the present invention can be adjusted simply by pushing the temple 4 down or pulling it up. The resistance force generated at the time of engagement between the engaging claw 11 of the internal contact body 3c and one of the engaging notches 12 in the connecting body 3a may be dissipated to the elongated hole 13 provided in the connecting body 3a and the substantially U shaped hole 17 provided in the internal contact body 3c. Consequently, pushing the temple 4 down or pulling the same up can be done smoothly so as to facilitate the angle adjustment of the lens 2 and the temple 4, thereby resulting in high operability.

Furthermore in the angle adjusting member 3 in the glasses of the present invention, the plate-shape connecting body 3a is unitarily provided on each of the right and left end portions of the frame 1, the plate-shape external contact body 3b is superposed on the outside of the connecting body 3a, while the plate-shape internal contact body 3c is superposed on the inside of the connecting body 3a. Consequently, the angle adjusting member 3 does not project outwardly from the frame 1.

Further, in the glasses of the present invention, at least the front outside portion of each angle adjusting member 3 is received within the top portion of each of the right and left ends of the lens 2 so that the outside face of the angle adjusting member 3 substantially flushes with the surface of the lens 2 and each top portion has the cut-out space portion 2b with which the angular transition of the angle adjusting member 3 becomes possible. The angle adjusting members 3 therefore do not protrude outwardly from the frame 1.

Figure 8:
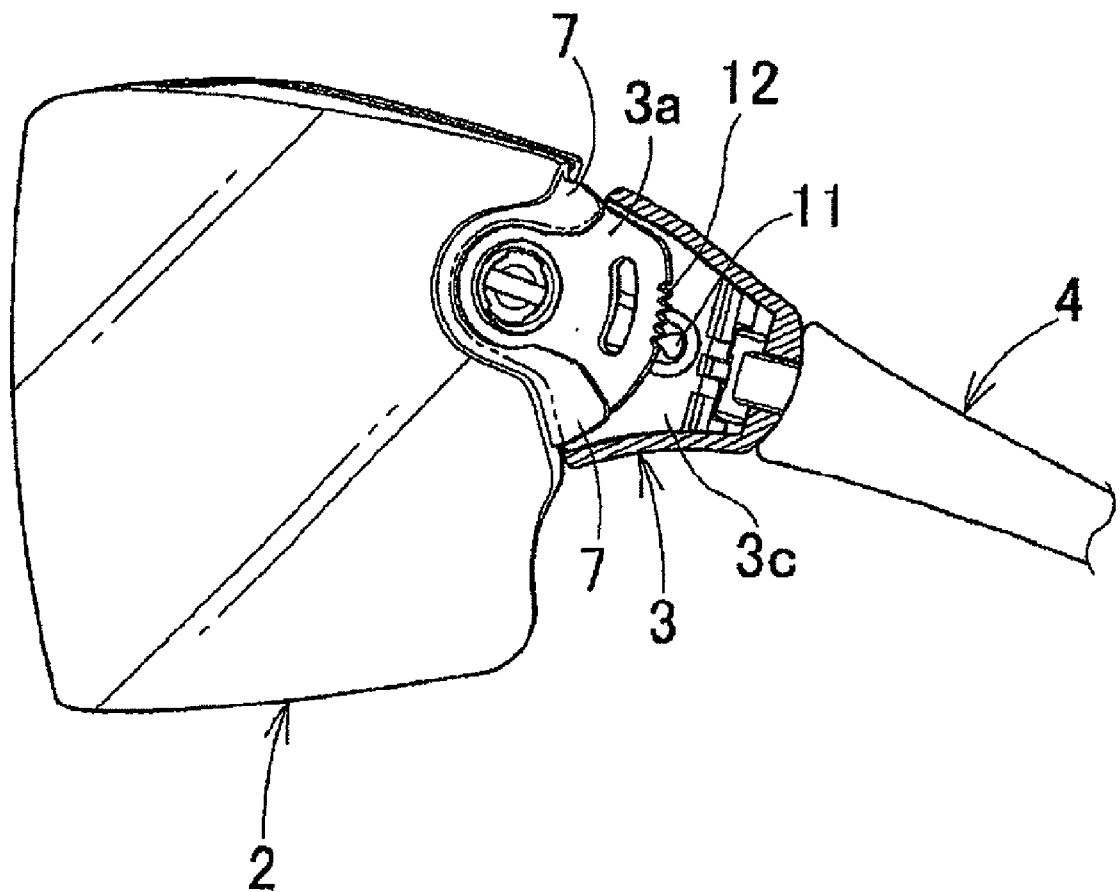
FIG. 8 is an explanatory view showing another posture after another adjustment of the angle between the lens and the temple of the eyeglasses of the present invention.
Figure 9:
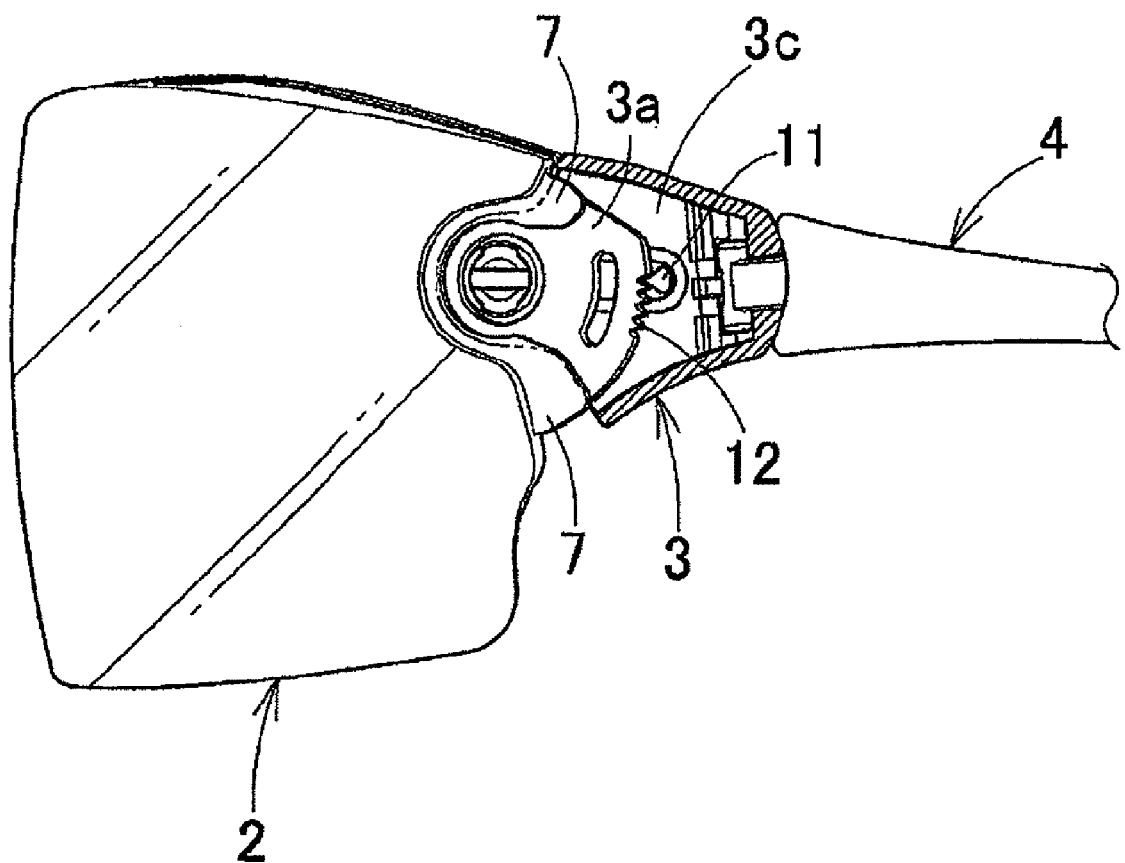
FIG. 9 is an explanatory view showing a further other posture after a further other adjustment of the angle between the lens and the temple of the eyeglasses of the present invention.
Figure 10:
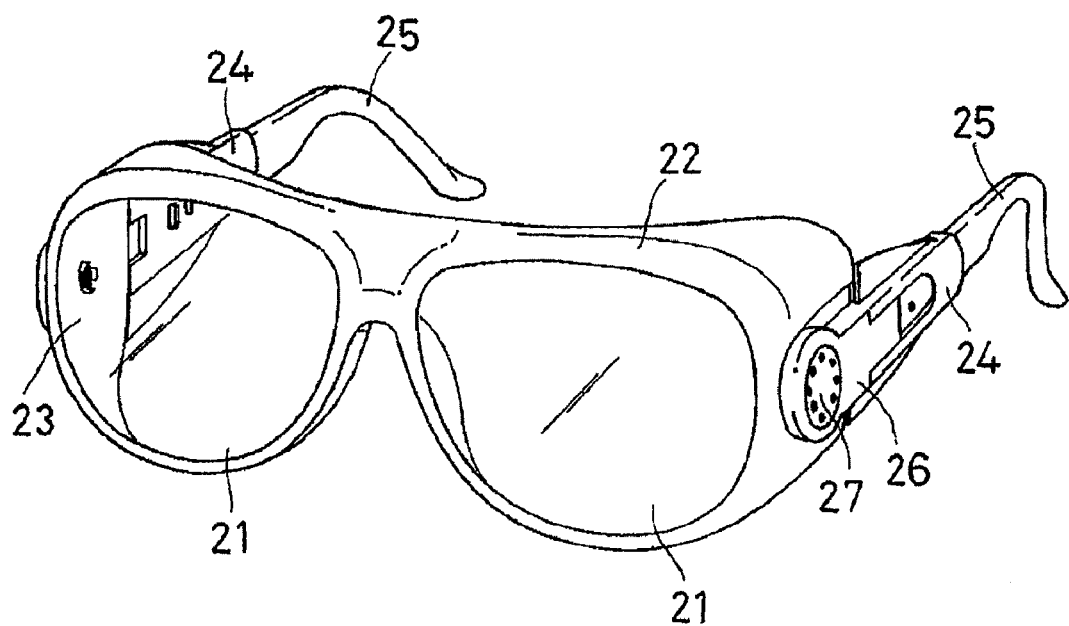
FIG. 10 is a perspective view showing an example of conventional eyeglasses.
Figure 11:
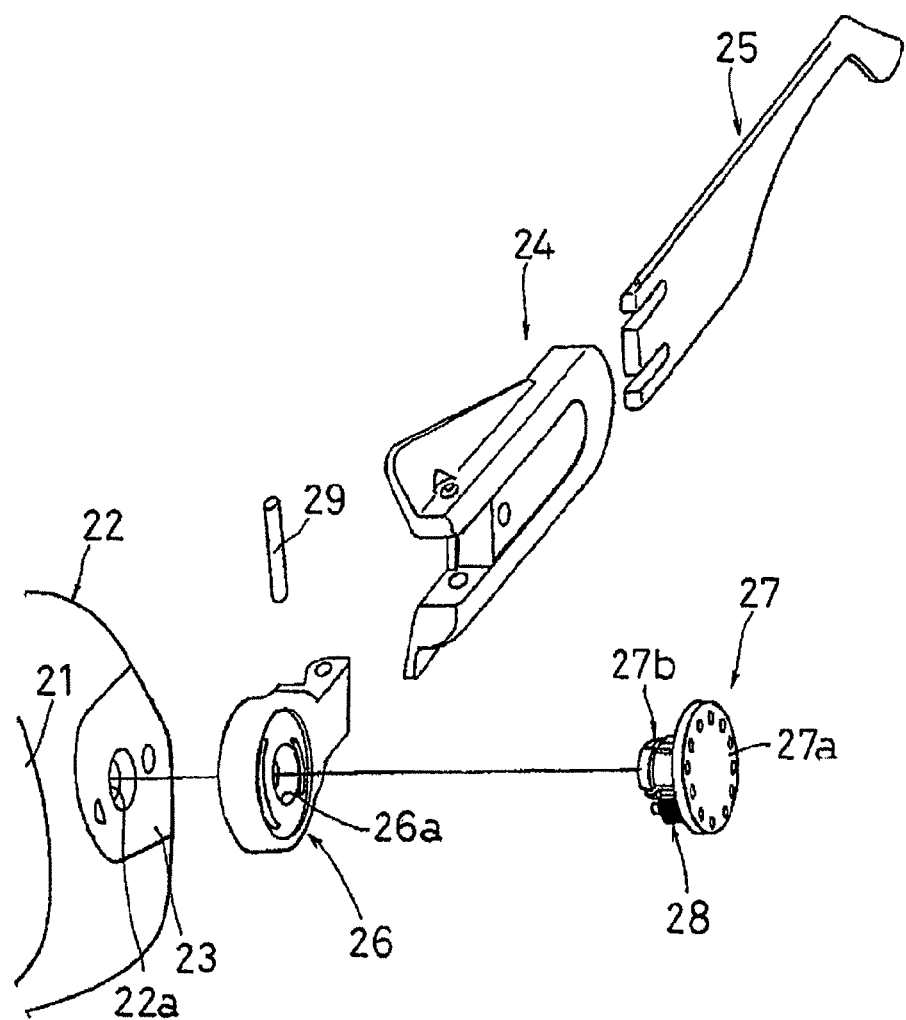
FIG. 11 is an exploded perspective view of an angle adjusting member of the conventional eyeglasses shown in FIG. 10.
Figure 12:
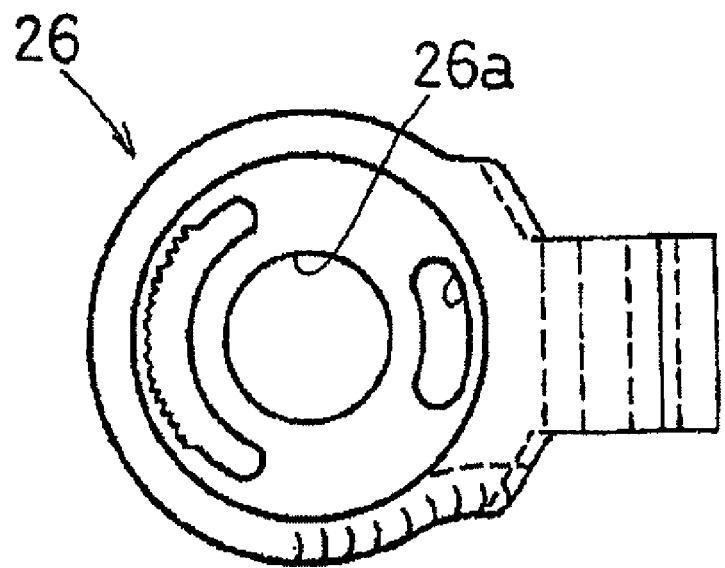
FIG. 12 is a front view of a rotary plate of the angle adjusting member of the conventional eyeglasses shown in FIG. 10.
Figure 13:
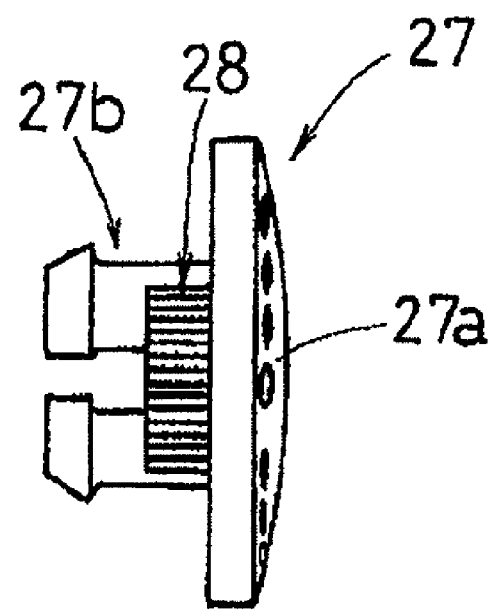
FIG. 13 is a side view of a stopper body of the angle adjusting member of the conventional eyeglasses shown in FIG. 10.
Figure 14:
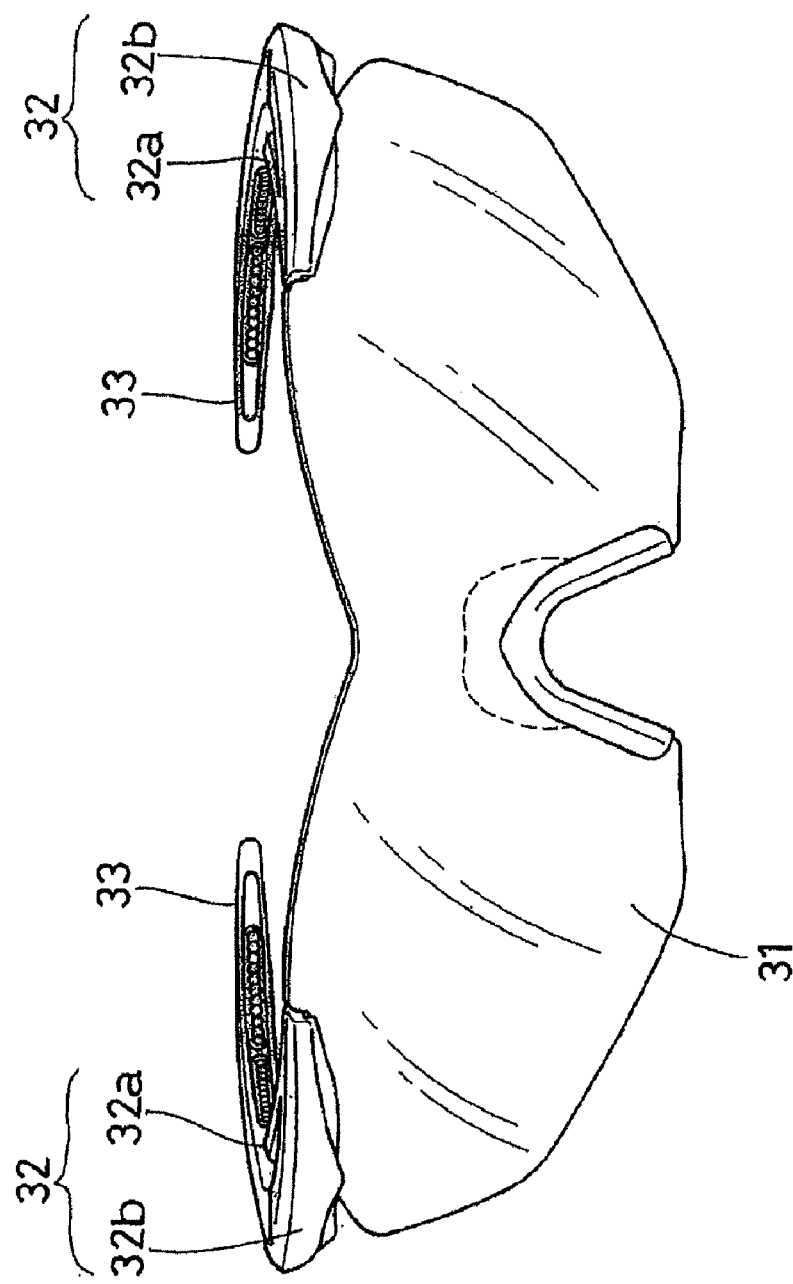
FIG. 14 is a front view showing another example of conventional eyeglasses.
Figure 15:
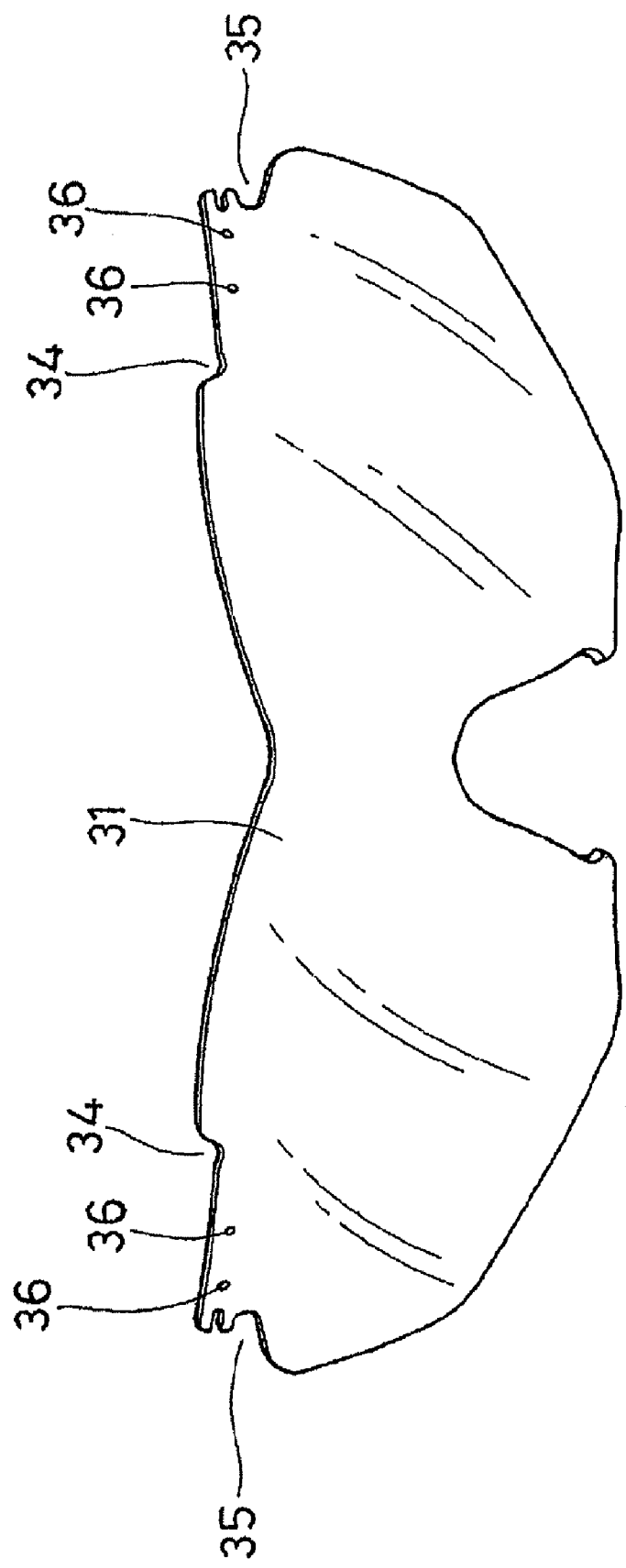
FIG. 15 is a front view of a lens of the conventional eyeglasses shown in FIG. 14.
Figure 16:
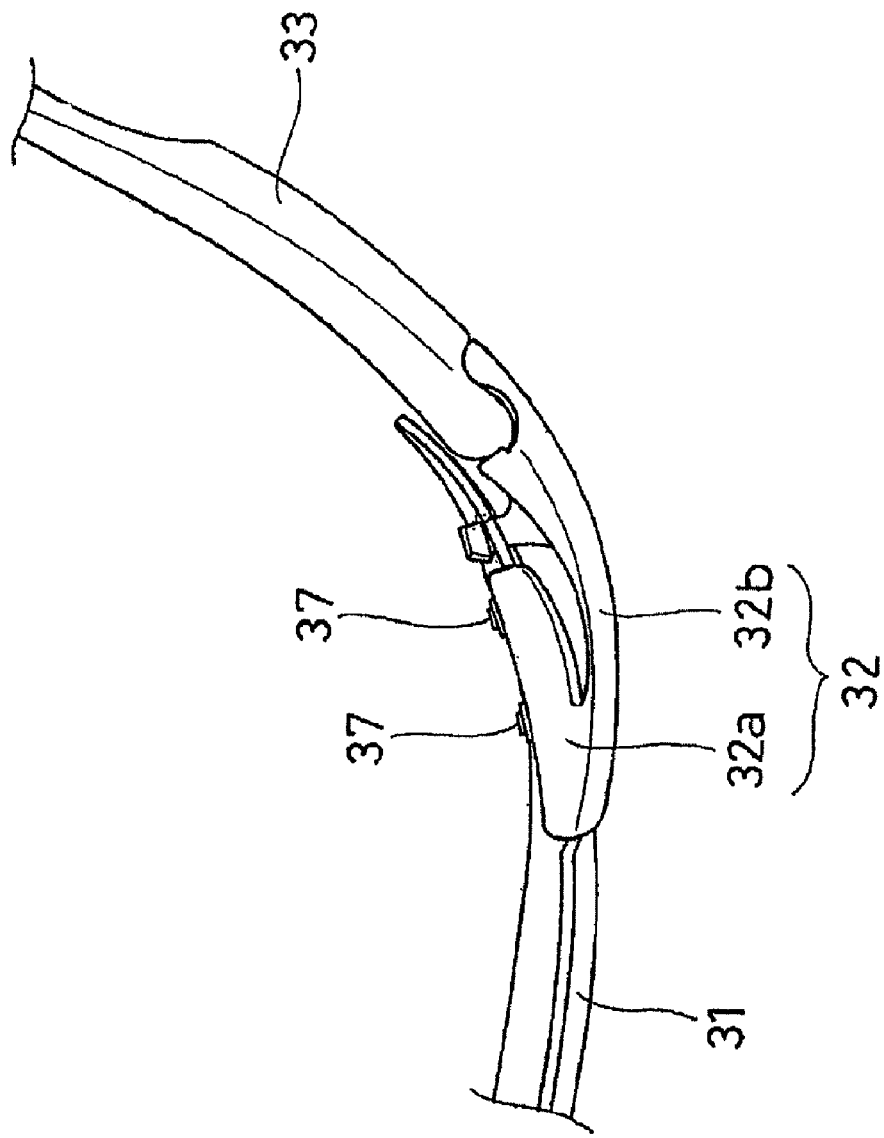
FIG. 16 is a partially enlarged plan view of the conventional eyeglasses shown in FIG. 14.
Figure 17:
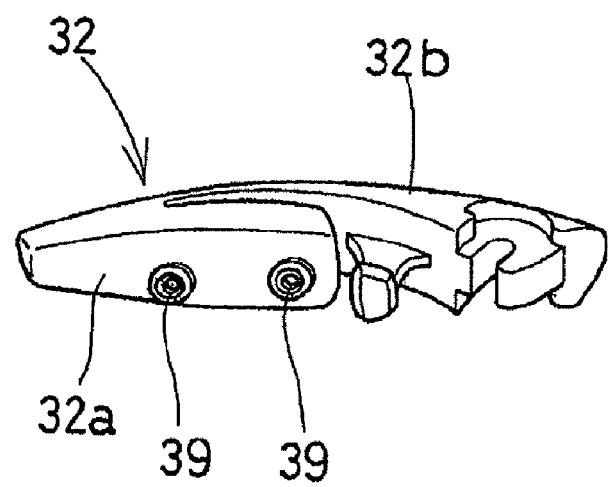
FIG. 17 is a perspective view of a temple attachment member of the conventional eyeglasses shown in FIG. 14.
Figure 18:
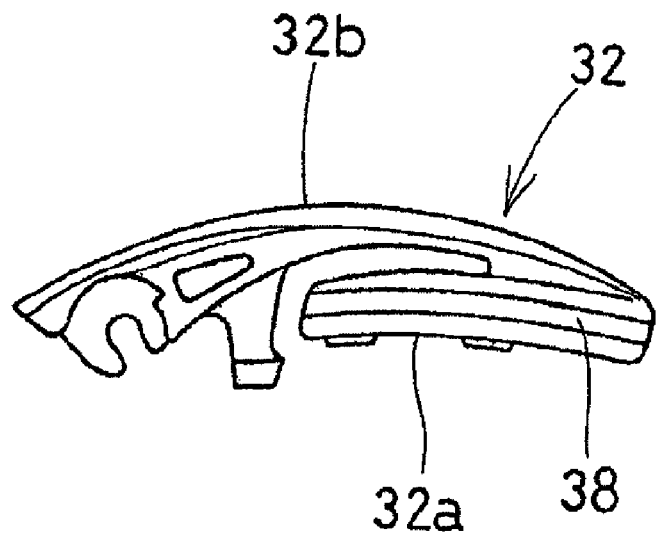
FIG. 18 is a bottom view of the temple attachment member of the conventional eyeglasses shown in FIG. 14.

In the glasses of the present invention, the cut-out space portion 2b at the top portion of each of the right and left ends of the lens 2 has the protruding blind pieces 7. As a result, at any angle position adjusted between the lens 2 and the temple 4, there exists no gap between the lens 2 and the angle adjusting member 3 as shown in FIGS. 7 to 9.

And in the glasses of the present invention, by lifting up the upper pressing portion 1a provided on the frame 1 to release the engagement between the small projection provided on the bottom side of the upper pressing portion 1a and the stopping portion 6 of the pinch portion 5 provided on the inner flange 2a of the lens 2, the lens 2 can be easily removed from the frame 1 and replaced with another one.

Assembly of the glasses of the present invention requires no tool and can be readily done. Further all the components are made of synthetic resin with no metal part, they can be easily dumped in a separate garbage disposal system, thereby producing no problem in disposal.

What is claimed is:

1. Eyeglasses having a frame with a lens and a couple of left and right temples provided at left and right sides of the frame respectively through angle adjusting members, wherein left and right end portions of the frame are provided with connecting bodies for the angle adjusting members, each of the angle adjusting members includes an external contact body, an internal contact body, and one of the connecting bodies, respectively being of plate-shape, a supporting shaft member projecting on an inside of the external body and a supporting shaft member projecting on an inside of the internal contact body are connected together and inserted in a supporting hole provided on the connecting body of the frame, an engaging claw projecting on the inside of the internal contact body selectively engages with one of plural engaging notches provided on the outer edge portion of the connecting body, and the external contact body is superposed on an outside of the connecting body and the internal contact body is superposed on an inside of the connecting body.

2. The eyeglasses according to claim 1 wherein the frame, the lens, the angle adjusting members and the temples are made of synthetic resin.

3. The eyeglasses according to claim 1 wherein the frame has at least at one position an upper pressing portion with a small protrusion on a bottom thereof and lower pressing portions under both sides of the upper pressing portion, the lens is provided with an inner flange at a top edge thereof, the inner flange includes pinch portions to be caught and held between the upper and lower pressing portions, the pinch portions are formed in recess on a upper face of the inner flange and has stopping portions on these recesses, the pinch portions of the inner flange of the lens are received between the upper and lower pressing portions of the frame, the small protrusion of the upper pressing portion is engaged with the stopping portion of the pinch portion of the inner flange so that the lens is detachably attached to the frame.

4. The eyeglasses according to claim 1 wherein the lens has, at its left and right side ends, cutout space portions into which at least front outer portions of the angle adjusting members are received so that the outside of the angle adjusting members is substantially flush with a front face of the lens and which enable angle transition of the angle adjusting members.

5. The eyeglasses according to claim 1 wherein the external contact body has a supporting groove at its rear end, each of the temples has a supporting shaft at its front end, and the supporting shaft is rotatably supported in the supporting groove.

6. The eyeglasses according to claim 1 wherein a substantially U-shaped hole is provided so as to surround the engaging claw projecting on the inside of the internal contact body.

7. The eyeglasses according to claim 1 wherein a rear half portion of each of the temples has an ear piece member which is freely adjustable in position to be held on a wearer's ear.

* * * * *